EVERETT LONG
GORDON PACKMAN
JOHN RAYMOND GURNER

Inventors

April 10, 1962 E. LONG ETAL 3,029,344
APPARATUS FOR DETECTING THE PRESENCE OF RADIOACTIVE
PARTICLES IN A GAS STREAM
Filed Oct. 3, 1957 4 Sheets-Sheet 3
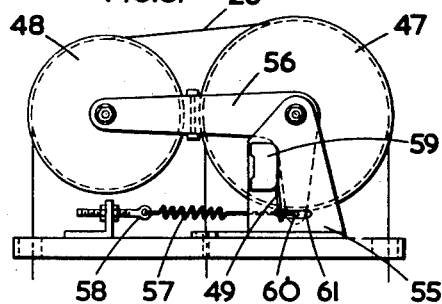
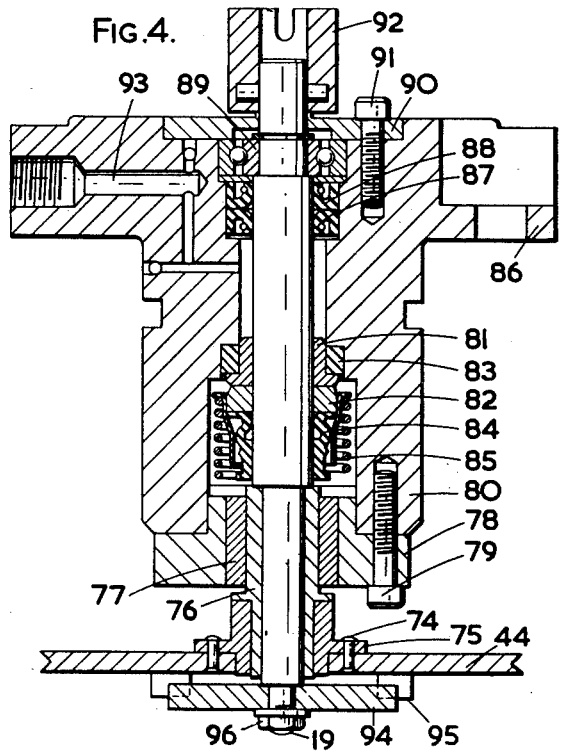
EVERETT LONG
GORDON PACKMAN
JOHN RAYMOND GURNER
Inventors
Attorneys

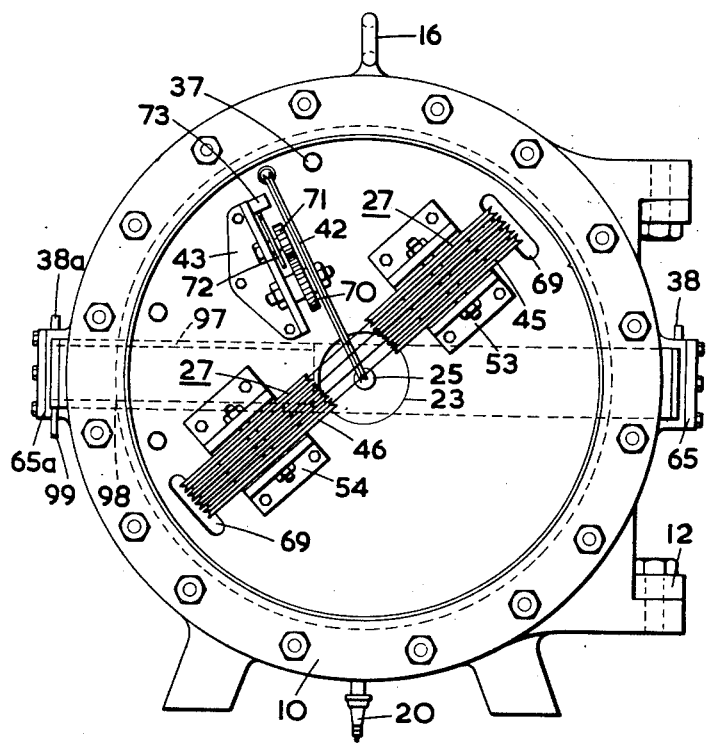

United States Patent Office 3,029,344
Patented Apr. 10, 1962

3,029,344
APPARATUS FOR DETECTING THE PRESENCE OF RADIOACTIVE PARTICLES IN A GAS STREAM
Everett Long, Culcheth, Warrington, Gordon Packman, Risley, Warrington, and John Raymond Gurner, Moulton, Northampton, England, assignors to United Kingdom Atomic Energy Authority and Plessey Company Ltd., London, England
Filed Oct. 3, 1957, Ser. No. 687,958
Claims priority, application Great Britain, Oct. 3, 1956
6 Claims. (Cl. 250—83.3)

This invention relates to apparatus for detecting the presence in a gas stream of radioactive particles which can be collected on a solid surface under the influence of an electric field and thereafter detected by monitoring the solid surface. Apparatus according to the invention has a principal application to the monitoring of coolant gas passing through a nuclear reactor in order to detect failure in the sheathing of the fuel elements of the reactor which shows itself in the escape of short lived gaseous fission products. These gaseous products decay to solid daughter products which can be collected on a negative wire or tape electrode swept by the gas. Such apparatus is hereinafter referred to as fuel element leak detector apparatus.

U.S.P. No. 2,576,616 discloses a known form of apparatus which is capable of functioning as a fuel element leak detector apparatus.

It is one object of the present invention to provide fuel element leak detector apparatus capable of operating under high pressure.

The problem arising from high pressure operation are those of overcoming leakage, of keeping pressure containers as small as possible, of providing prefailure and failure warnings of components in the pressurized containers and of design affording a structure needing the minimum of maintenance.

The apparatus of the invention comprises a pressure tight vessel having inside the vessel two spaced multiple pulley groups and between the pulley groups a precipitation chamber and a radiation detector, an endless wire or tape making one pass through said precipitation chamber and radiation detector and thence alternately over a pulley in each pulley group, means for moving the wire or tape in steps in a direction from the chamber to the detector so that the portion of wire or tape exposed in the chamber between steps is moved to the detector on the step and means for feeding gas through said chamber.

Figure 1:
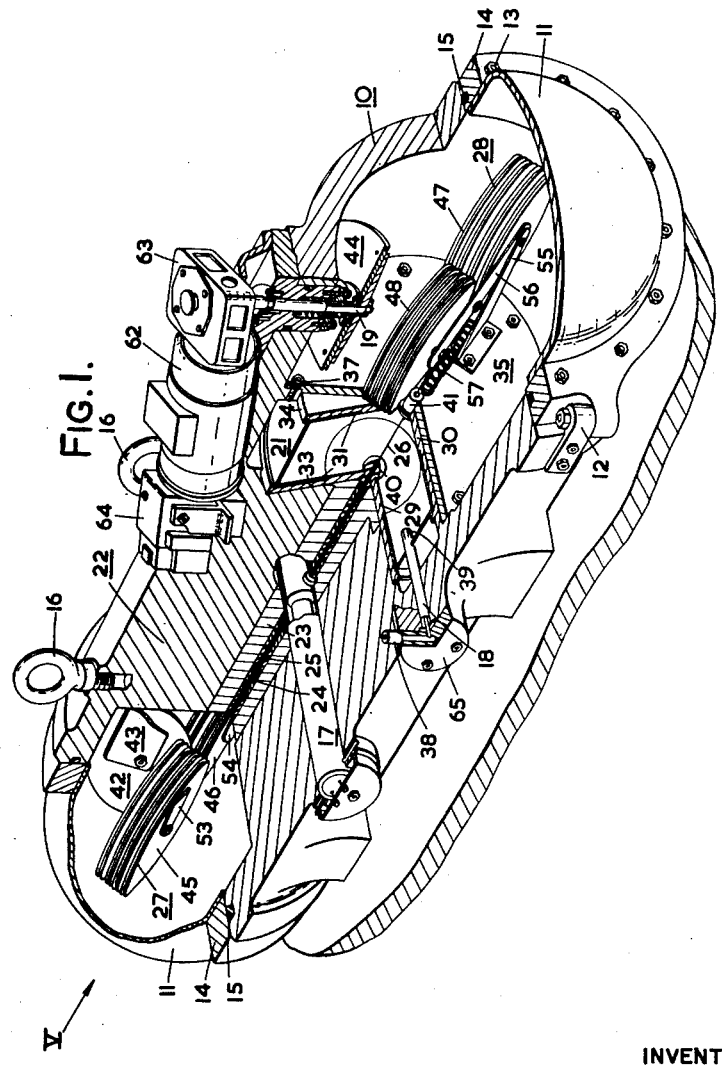
Figure 2:
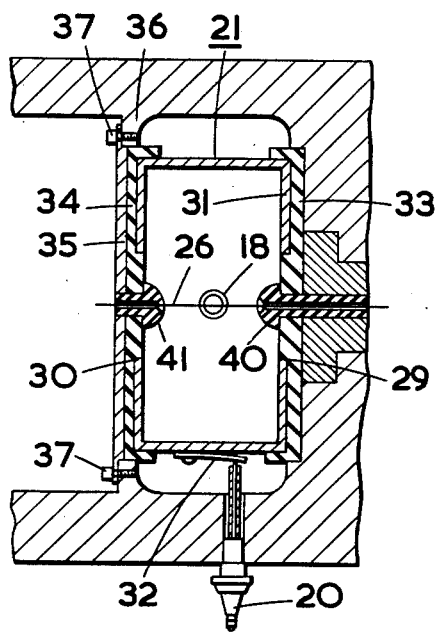
Figure 6:
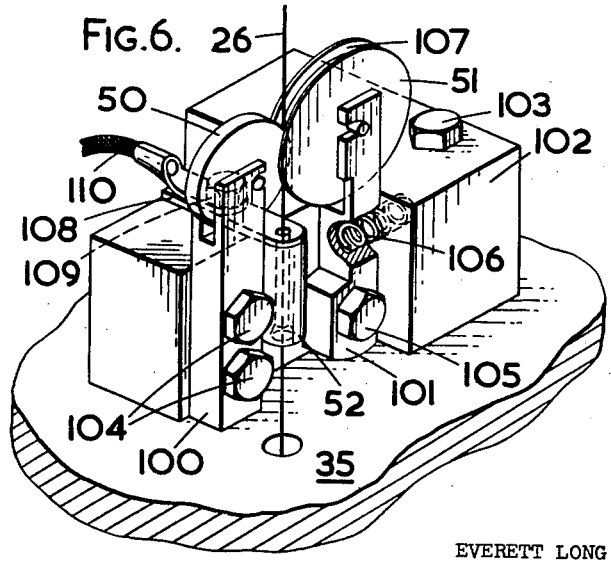

An embodiment of the invention will now be described with reference to the accompanying drawings wherein:

FIG. 1 is a cut-away perspective view; FIG. 2 is a sectional view of a precipitation chamber; FIG. 3 is an elevation of one pulley group showing part of the broken wire alarm; FIG. 4 is a sectional view of the wire drive motor gland; FIG. 5 is an end elevation in the direction of the arrow V of FIG. 1 with the end cover removed and FIG. 6 is a perspective view of the broken strand alarm.

In FIG. 1 a presure shell 10 comprising a cast iron cylinder 45 ins. long and 21.5 ins. outside diameter with a minimum wall thickness of 2.3 ins. is provided with domed steel end covers 11 hinged at 12 and secured by bolts 13 acting through flanges 14 containing sealing rings 15. Lifting eyes 16 are provided. The shell 10 is penetrated to admit a photomultiplier tube assembly 17, an active gas inlet tube 18, an active gas outlet tube (not shown) similar to and diametrically opposite the active gas inlet tube 18, a motor drive shaft 19, a high tension terminal 20 (FIG. 2) to a precipitation chamber 21 and various minor electrical leads. A blind tube 97 (FIG. 5) containing a radioactive source for calibrating the phosphor in the photomultiplier tube assembly 17 is inserted in the pressure shell 10 diametrically opposite the photomultiplier tube assembly so as to meet with it. Surrounding the tube 97 is a bleed space 98 with a inlet 99 which feeds a purge gas around the photomultiplier tube assembly 17 to prevent active gas reaching the phosphor. This purge gas flows along the wire into the precipitation chamber 21. The photomultiplier tube assembly 17 is surrounded by additional shielding made of inner and outer cast iron plugs 22 and 23, the outer plug 22 being formed integral with the shell 10. The inner plug 23 is tubular and is internaly lined with small stainless steel sleeves 25 to provide a channel 24 for an endless wire 26 mounted on pulley groups 27, 28. The wire makes one pass through the photomultiplier tube assembly 17 and precipitation chamber 21. Passages 69 (FIG. 5) are provided in the outer plug 22 for the multiple passes of the wire between pulley groups 27, 28.

Referring now also to FIG. 2, the precipitation chamber 21, fabricated from stainless steel sheet, is cylindrical in form, 12 in. diameter and 6 in. long, with the wire 26 running at the cylinder axis. Holes 29, 30, five inches in diameter and concentric with the cylinder axis are cut in the chamber end plates 31. The chamber 21 is connected to the high tension terminal 20 via contact 32. (The holes 29, 30 promote focussing of the electrostatic field in the middle of the chamber 21 and hence the centre region of wire 26 in the chamber.) The chamber 21 is insulated from the shell 10 by insulating plates 33, 34 and held in position by a mild steel cover plate 35 secured to a flange 36 on the shell 10 by bolts 37. The active gas inlet tube 18, of insulating material, connects to an inlet coupling 38, in a cover plate 65. The tube 18 passes through the cylindrical wall of the chamber 21 and an identical active gas outlet tube (as indicated by cover 65a and tube 38a in FIG. 5) passes through the chamber 21 at a point diemetrically opposite the tube 18. The ends of the inlet and outlet tubes are blanked off and the gas enters and leaves through slots 39 to ensure adequate scavenging of the chamber by the gas. Two hemispherical insulators 40, 41 are provided to help concentrate ion precipitation on to the central section of that part of the wire 26 which is within the chamber 21, i.e. on to that which will come opposite the phosphor in the photomultiplier tube assembly.

The wire 26 consists of stranded stainless steel (20 strands of 43 S.W.G., approximately 0.030" overall diameter) and is joined by crimping the ends together using steel ferrules. From the precipitation chambers 21 and photomultiplier tube assembly 17 the wire 26 passes over a guide pulley 42, supported on a bracket 43 (see also FIG. 5) on to a driving pulley 44, thence backwards and forwards four times between the pulley group 27 and pulley group 28 before returning to the chamber 21. The pulley groups 27, 28 each consist of two pulley banks 45, 46 and 47, 48 each having four impregnated fibre pulleys. All the pulleys are arranged to run independently on plain bearings lubricated by the use of molybdenum disulphide plated on to the case hardened steel bearing surfaces. One pulley in each bank is a "master" pulley fitted with an extended hub running on two widely spaced bushes. The other pulleys of the banks run on the appropriate extended hubs. The banks 45, 46 are supported by brackets 53 and 54 respectively (see also FIG. 5) and the bank 47 by the bracket 55 but the bank 48 is supported on a bell crank 56 (FIG. 3). The bell crank 56 is coupled with a spring 57 secured to the shell 10 by a bolt 58 to maintain the tension in the wire 26 at a predetermined value. In the event of the wire 26 breaking the bell crank 56 operates a small switch 59 which initiates an alarm. A pin 60 attached to the bell-crank 56 passes through a slot 61 in the bracket 55 and thence to an operating arm 49 of the switch 59.

In FIG. 5 the pulley 42 is shown coupled with a gear wheel 70 which drives a smaller gear wheel 71 (1.5:1 ratio). The gear wheel 71 carries a cam 72 on which rides the operating plunger of a switch 73.

A strand failure alarm is provided to give warning of frayed strands in the wire 26 and is shown in FIG. 6. The wire 26, running on insulated pulley wheels and clear of the precipitation chamber 21 and pressure shell 10, is connected to earth by two small wheels 50, 51 which are supported on brackets 100, 101, mounted on a block 102 of insulating material secured to the mild steel plate 35 by a bolt 103. Both brackets are in contact with the plate 35 and hence with the shell 10. The bracket 100 is fixed to the block 102 by bolts 104. The bracket 101 is pivoted on bolt 105 and the wheel 51 is held against the wheel 50 by the action on the bracket 101 of a compressed spring 106 in the block 102. The wire 26 runs in a groove 107 in the wheel 51 and the wheel 50 also fits in the groove 107 to ensure good contact between wheels 50, 51 and wire 26. From the wheels 50, 51 the wire 26 runs through a metal tube 52 with an extension 108 which is attached to the block 102 by a bolt 109 which also serves to connect an electrical lead 110 to the extension 108. The metal tube 52 and extension 108 are insulated from earth and the lead 110 is connected via the strand failure alarm relay to the positive pole of a 50 volt electricity supply. If a broken strand passes through the tube 52 it touches the tube to operate the alarm relay circuit.

The driving pulley 44 is coupled with the drive shaft 19 via a shock absorbing coupling (described below), and the shaft 19 is driven by a 3-phase motor 62 through a 1440 to 29 reduction gear box 63. The motor is stopped and started under control of the switch 73 and a 30 second time delay by a controller acting in conjunction with a starter and magnetic brake assembly 64. It is thus arranged for the wire to remain stationary for thirty seconds and then advance to the photomultiplier assembly 17 in two seconds when it is stopped by the cam 72 operating switch 73 to energise the magnetic brake.

Referring to FIG. 4 the shaft 19 has six blades 94 held in slots in the shaft 19 by a nut and washer 96. The blades have their ends resting loosely in slots provided by projections 95 on the underside of the pulley 44 thereby providing a flexible coupling between shaft and pulley. The pulley 44, which is of insulating material is secured to a metal boss 75 by rivets 74. The boss 75 is keyed to a sleeve 76 on the shaft 19 and the sleeve 76 runs in a bearing 77 supported by a carrier 78 secured by screws 79 to a gland body 80. The body 80 has a flange 86 whereby the whole gland assembly can be secured to the pressure shell 10 and the body houses a graphite face seal. This seal comprises a rotating graphite member 82 on a carrier 84 loaded by a spring 85 and a fixed graphite member 81 sealed to the body 80 by a sealing ring 83. At the top end of the shaft a roller bearing 89 is provided together with two spring loaded seals 87, 88, a cover plate 90 and fixing screws 91. The drive to the shaft is by a coupling 92. A channel 93 is provided in the body 80 so that any leakage through the seal 82/83 can be utilised to operate an alarm.

We claim:

1. Apparatus comprising a pressure tight vessel having inside the vessel two spaced multiple pulley groups and between the pulley groups a precipitation chamber and a radiation detector, an endless wire or tape chargeable to form a negative electrode and making one pass through said precipitation chamber and past said radiation detector and thence alternately over a pulley in each pulley group, means for moving the wire or tape in steps in a direction from the chamber to the detector so that the portion of wire or tape exposed in the chamber between the steps is moved to the detector on the step and means for feeding gas through said chamber.

2. Apparatus as claimed in claim 1 in which the pressure vessel has means for inserting a radioactive source in the vicinity of the radiation detector for calibrating the detector.

3. Apparatus according to claim 1 in which means are provided for feeding a purge gas round the radiation detector and means are provided to allow flow of the purge gas along the wire or tape to the precipitation chamber.

4. Apparatus as claimed in claim 1 in which the endless wire or tape has means for keeping it at one potential and is arranged to pass through a metal tube having means for keeping the tube at another potential, the tube being slightly larger in size than the said wire or tape.

5. Apparatus as claimed in claim 1 wherein one of said pulley groups is mounted on a pivoted arm adapted to move when the tension in the wire or tape relaxes and by the movement of said pivoted arm a switch is arranged to be operated by energizing an alarm.

6. Apparatus as claimed in claim 1 wherein the means for moving the wire or tape comprises a motor coupled via a flexible coupling to drive a pulley over which the wire or tape runs and having a driving shaft penetrating the pressure vessel sealed by two glands in passage through the vessel, and means for detecting leakage of gas flow into the space between the glands.

References Cited in the file of this patent

UNITED STATES PATENTS

| 2,576,616 | Livingston et al. | Nov. 27, 1951 |
| 2,666,857 | McLaren et al. | Jan. 19, 1954 |
| 2,751,505 | Anderson | June 19, 1956 |

OTHER REFERENCES

Arthur, Abstract of application Serial No. 206,829, published February 26, 1952; 655 O.G. 1177.

Watts et al.: "Monitor Measurer Air and Surface Contamination," Nucleonics V13#1, pages 51–52, January 1955.

Collins: "A Continuous Monitor for Airborne Plutonium," AEC Research and Development Report DP–188 (Instrumentation), November 1956.